E. I. DODDS.
BRAKE BEAM.
APPLICATION FILED MAR. 25, 1908. RENEWED APR. 12, 1909.
926,395.
Patented June 29, 1909.
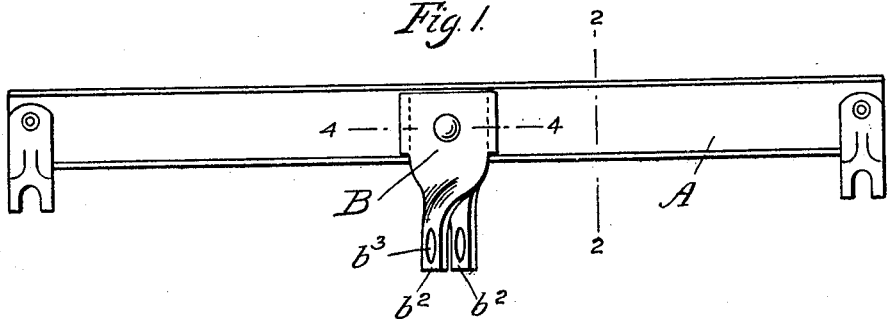
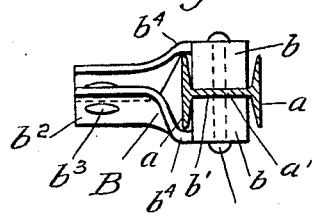
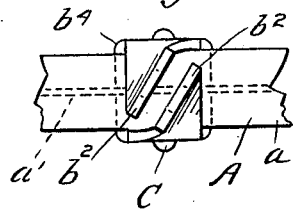
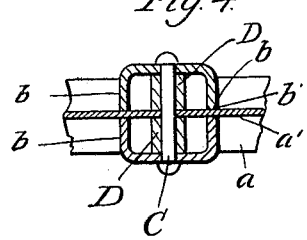
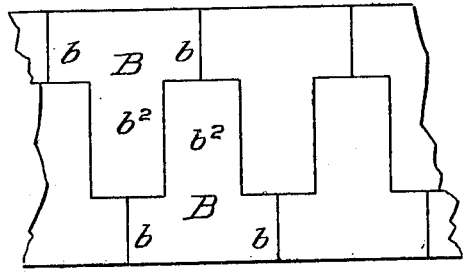
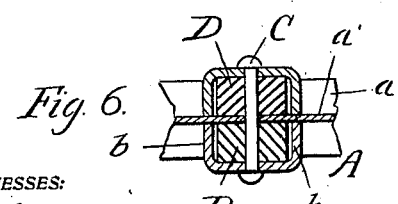
WITNESSES:
F. B. Townsend
A. W. Munday
INVENTOR
Ethan I. Dodds
BY
Munday, Evarts, Adcock & Clarke
his ATTORNEYS
THE NORRIS PETERS CO., WASHINGTON, D. C.

UNITED STATES PATENT OFFICE.

ETHAN I. DODDS, OF CENTRAL VALLEY, NEW YORK.

BRAKE-BEAM.

No. 926,395.          Specification of Letters Patent.          Patented June 29, 1909.

Application filed March 25, 1908, Serial No. 423,156. Renewed April 12, 1909. Serial No. 489,525.

*To all whom it may concern:*

Be it known that I, ETHAN I. DODDS, a citizen of the United States, residing in Central Valley, in the county of Orange and State of New York, have invented a new and useful Improvement in Brake-Beams, of which the following is a specification.

My invention relates to improvements in brake beams, and more particularly to brake beam fulcrums.

The object of my invention is to provide a brake lever fulcrum of a simple, efficient and durable construction, capable of being cheaply manufactured and readily and securely applied to the brake beam, and the members or parts of which are adapted to be cut from metal plates without waste and readily forged or stamped into shape.

My invention consists in the means I employ to practically accomplish this object or result, as herein shown and described and more particularly set forth in the claims.

In the accompanying drawing, forming a part of this specification, Figure 1 is a plan view of a brake beam embodying my invention; Fig. 2 is a section on line 2—2 of Fig. 1; Fig. 3 is a front elevation; Fig. 4 is a section on line 4—4 of Fig. 1; Fig. 5 is a diagrammatic view showing the form of the fulcrum members in the flat, and illustrating how they may be cut from a metal plate without waste; and Fig. 6 illustrates a modification.

In the drawing A represents the brake beam of a rolled steel I-beam shape, B B are my improved forged or stamped plate steel fulcrum members, each having a pair of right angle flanges $b$ $b$ adapted to fit between the flanges $a$ $a$ of the brake beam A, and engage at their inner edges $b^1$ the web $a^1$. Each of the fulcrum members B is further provided with an integral twisted shank or tongue $b^2$, having a hole $b^3$ to receive the pivot pin of the brake lever. The shank or tongue $b^2$ is twisted at an angle of about 45°, so that the brake lever, which is between the shanks $b^2$ $b^2$ of the two fulcrum members B B may stand at an angle of about 45° or such other angle as may be required to the brake beam. The two fulcrum members B B are secured to the brake beam by a rivet or other clamping device C.

D D are filler blocks or thimbles, which may be inserted between the flanges $b$ $b$ of the fulcrum members B.

Each of the twisted shanks $b^2$ is furnished with a bend $b^4$ which snugly hugs and embraces the outer face $a^2$ of the adjacent brake beam flange $a$. The bends $b^4$ in the shanks of the plate steel fulcrum members B, in connection with the bent side wings or angle flanges $b^2$, serve to snugly anchor the fulcrum members to the brake beam.

In the modification illustrated in Fig. 6 the blocks or thimbles D are enlarged to snugly fill the spaces between the bent side wings $b^2$ of the fulcrum plate B.

I claim:

1. A brake beam fulcrum, comprising a pair of plate steel fulcrum members fitting on opposite sides of the brake beam, each furnished with bent flanges at their side edges adapted to fit between the flanges of the brake beam and engage the web thereof, and a twisted shank having a hole to receive the pivot pin of the brake lever, substantially as specified.

2. The combination with a brake beam, of a fulcrum for the brake lever, comprising a pair of fulcrum plates, one fitting on each side of the brake beam, and each having at its side edges flanges bent at an angle thereto fitting between the flanges of the brake beam, and a projecting bent shank portion to receive the brake lever, substantially as specified.

3. The combination with a brake beam, of a fulcrum for the brake lever, comprising a pair of fulcrum plates, one fitting on each side of the brake beam, and each having at its side edges flanges bent at an angle thereto fitting between the flanges of the brake beam, a projecting shank portion to receive the brake lever, and a rivet extending through said fulcrum plates and the brake beam, substantially as specified.

4. The combination with a brake beam, of a fulcrum for the brake lever, comprising a pair of fulcrum plates, one fitting on each side of the brake beam, and each having at its side edges flanges bent at an angle thereto fitting between the flanges of the brake beam, a projecting shank portion to receive the brake lever, a rivet extending through said fulcrum plates and the brake beam, and filler blocks, substantially as specified.

5. The combination with a brake beam, of a fulcrum for the brake lever, comprising a pair of fulcrum plates, one fitting on each side of the brake beam, and each having at its side edges flanges bent at an angle thereto fitting between the flanges of the brake beam, and a projecting twisted shank portion to receive the brake lever.

6. A brake beam fulcrum, comprising a pair of metal plates having bent side wings adapted to fit between the flanges of the brake beam and engage the web thereof, said plates also having bent and twisted shanks embracing the adjacent flange of the brake beam and adapted to receive the brake lever, substantially as specified.

7. A brake beam fulcrum, comprising a pair of metal plates having bent side wings adapted to fit between the flanges of the brake beam and engage the web thereof, said plates also having bent and twisted shanks embracing the adjacent flange of the brake beam and adapted to receive the brake lever, in combination with a brake beam and a connecting pin or rivet extending through said fulcrum plates and brake beam, substantially as specified.

8. A brake beam fulcrum, comprising a pair of metal plates having bent side wings adapted to fit between the flanges of the brake beam and engage the web thereof, said plates also having bent and twisted shanks embracing the adjacent flange of the brake beam and adapted to receive the brake lever, in combination with a brake beam and a connecting pin or rivet extending through said fulcrum plates and brake beam, and a pair of filler blocks or thimbles fitting between said bent side wings of said fulcrum plates, substantially as specified.

ETHAN I. DODDS.

Witnesses:
 WILLIAM A. GEIGER,
 H. M. MUNDAY.